US012618503B2

(12) United States Patent
Gallian et al.

(10) Patent No.: US 12,618,503 B2
(45) Date of Patent: May 5, 2026

(54) SYSTEM AND METHOD FOR CONTAINMENT OF FLUIDS FROM A COMPROMISED PIPE OR PIPING SYSTEM

(71) Applicant: Colt Services, LLC, La Porte, TX (US)

(72) Inventors: Matthew R. Gallian, Houston, TX (US); Wesley R. Hoffer, Beaumont, TX (US)

(73) Assignee: Colt Services, LLC, Houston, TX (US)

( * ) Notice: Subject to any disclaimer, the term of this patent is extended or adjusted under 35 U.S.C. 154(b) by 455 days.

(21) Appl. No.: 17/951,004

(22) Filed: Sep. 22, 2022

(65) Prior Publication Data

US 2024/0102596 A1     Mar. 28, 2024

(51) Int. Cl.
  *F16L 55/17*      (2006.01)
  *F16L 55/18*      (2006.01)

(52) U.S. Cl.
  CPC .............. *F16L 55/17* (2013.01); *F16L 55/18* (2013.01)

(58) Field of Classification Search
  CPC .................................. F16L 55/17; F16L 55/18
  USPC ........................................................... 138/99
  See application file for complete search history.

(56) References Cited

U.S. PATENT DOCUMENTS 3,770,301 A * 11/1973 Adams .................. F16L 23/165
                                              285/294.4
4,240,650 A * 12/1980 Adams .................. F16L 55/175
                                              285/15

4,630,647 A * 12/1986 Thomson ............ F16L 55/1725
                                              24/279
4,927,181 A * 5/1990 Ciotola ................. F16L 55/175
                                              285/294.4
8,210,210 B2   7/2012 Clark et al.
9,175,799 B2  11/2015 Clark et al.
(Continued)

FOREIGN PATENT DOCUMENTS

CN        202691439 U     1/2013
CN        207394224 U     5/2018
(Continued)

OTHER PUBLICATIONS

Search Report for International App. No. PCT/US2023/033546 dated Jan. 25, 2024.
(Continued)

*Primary Examiner* — David R Deal
(74) *Attorney, Agent, or Firm* — Troutman Pepper Locke LLP

(57) ABSTRACT

Embodiments presented provide a modular repair enclosure for repairing or sealing leaks or potential leaks in a pipe. In some embodiments, the modular repair enclosure comprises three or more interchangeable enclosure sections that, when assembled around a section of pipe, seal the section of pipe and provide containment for any leaks in the section of pipe. The use of three or more interchangeable enclosure sections allows much thinner materials to be used to construct enclosure compared to a 2-piece enclosure, and also results in much less wasted material. Such an arrangement allows significant cost savings to be realized. These interchangeable enclosure sections can also be pre-manufactured and stocked in inventory, allowing for much faster response times to make the repair on a leaking pipe, where conventional methods would require custom manufacturing.

20 Claims, 10 Drawing Sheets

(56)                    References Cited

U.S. PATENT DOCUMENTS

| 11,460,138 | B1 * | 10/2022 | Smyth | ..................... | F16L 55/18 |
| 2004/0163723 | A1 * | 8/2004 | Taylor | ....................... | F16L 1/26 |
| | | | | | 285/15 |
| 2011/0023975 | A1 | 2/2011 | Clark et al. | | |

FOREIGN PATENT DOCUMENTS

| KR | 100294431 | B1 | 4/2000 |
| KR | 102352798 | B1 | 1/2022 |

OTHER PUBLICATIONS

Written Opinion for International App. No. PCT/US2023/033546 dated Jan. 25, 2024.

* cited by examiner

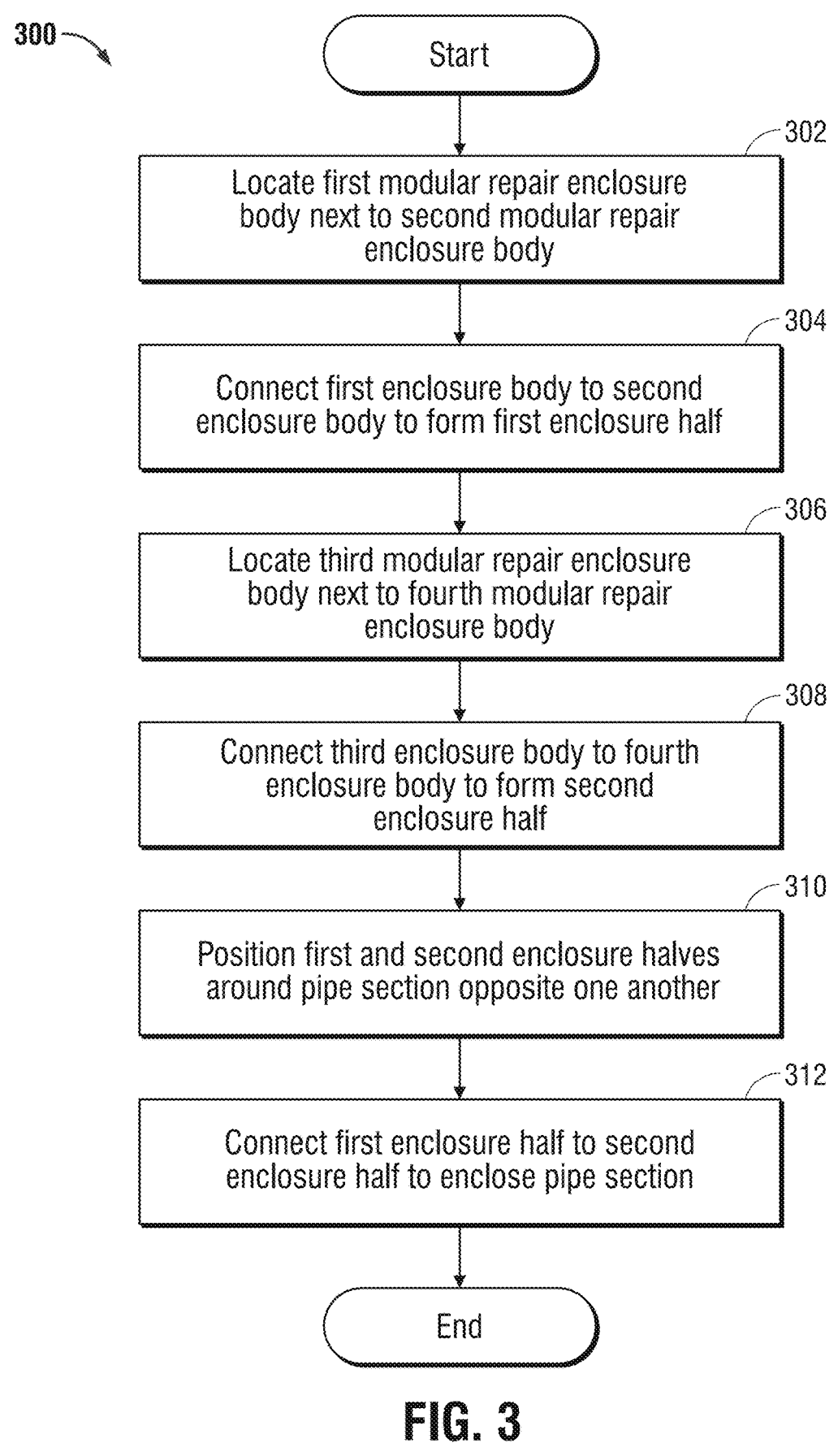

300

Start

302

Locate first modular repair enclosure body next to second modular repair enclosure body

304

Connect first enclosure body to second enclosure body to form first enclosure half

306

Locate third modular repair enclosure body next to fourth modular repair enclosure body

308

Connect third enclosure body to fourth enclosure body to form second enclosure half

310

Position first and second enclosure halves around pipe section opposite one another

312

Connect first enclosure half to second enclosure half to enclose pipe section

End

FIG. 3

SYSTEM AND METHOD FOR CONTAINMENT OF FLUIDS FROM A COMPROMISED PIPE OR PIPING SYSTEM

CROSS-REFERENCE TO RELATED APPLICATIONS

None.

FIELD OF THE DISCLOSURE

Aspects of the disclosure relate to repairing and sealing of leaks in piping components under pressure and, more particularly, to an apparatus and method for easily containing a section of pipe that has or may leak using a cost effective and standardized connective apparatus that can be easily assembled around a section of a fluid carrying pipe in the field and subsequently removed. Aspects of the disclosure also apply to corrupted non-leaking piping as a preventative maintenance procedure to eliminate the risk of a future leak.

BACKGROUND

Leaking pipes can be a problematic issue that occurs at industrial, commercial and residential locations. When a pipe leak at an industrial or commercial location occurs, the pipe leak severity may dictate the actions of operators and/or maintenance personnel in dealing with the situation. As can be understood, when a pipe leak occurs, fluid contents of the pipe may exit the pressure boundary of the pipe and become "uncontrolled" within the local vicinity. If the pipe carries water, maintenance on the pipe may involve channeling the running fluid (such as water) to a drain within a building. If a large amount of water is carried by the pipe, drains may not be able to withstand the amount of flow. If the pipe carries a liquid other than water, then more elaborate precautions may have to be performed. In such instances, the liquid may have to neutralized to prevent acid/basic reaction with local equipment. The liquid may also generate vapors that become airborne and potentially cause a health hazard to workers. In such instances, evacuation of personnel may have to occur as well as providing a supply of fresh air to the leak site.

As can be seen from the above, various factors, including the type of fluid, temperature, air pressure, types of surrounding equipment, availability of drains and other factors may affect the function of a work site. To alleviate these concerns, it is better to contain a leak at the source rather than to let the leak spread. To this end, conventional technology provides some solutions. These solutions, however, have their own drawbacks that have not been solved.

Referring to FIG. 1, a conventional or prior art apparatus is illustrated. The apparatus 100 entails creating a welded box 102 around a section of pipe 104 that has a leak. In this embodiment of the apparatus 100, the box is a four (4) sided square shape around the pipe 104 which is configured approximately circular. Generally, three (3) side portions 106a, 106b, 106c are pre-welded together and lowered over the section of pipe 104. A fourth side portion 106d is then raised to contact the first and third side portions 106a and 106c. A welder then creates tack welds 108 (only one weld shown for simplicity) connecting fourth side portion 106d to first and third side portions 106a and 106c. The tack welds 108 allow the apparatus 100 to maintain a proper shape, as the welder goes back to an end portion of the side portion 106d and welds along the entire side connecting side portions 106d to 106a. The process is then continued as a full length weld is placed along the connecting sides of 106d and 106c.

At this juncture, an open-ended box 110 is formed around the section of pipe 104. Next, individual half ends 112a, 112b, 114a, 114b are created to seal the ends of the box 110. Individual half ends 112a, 112b form one box end 112 for the box 110, while Individual half ends 114a, 114b form an opposite box end 114 for the box 110. Each individual half end 112a, 112b, 114a, 114b has a semicircular portion removed therefrom such that a circular opening 116 is formed in each box end 112, 114 when their respective half ends 112a, 112b, 114a, 114b are assembled. Each of these half ends 112a, 112b, 114a, 114b are individually templated and then a raw steel plate is fabricated into the desired templated shape. In the event that the leak is in a high pressure pipe, the thickness of the raw steel plate required can exceed 1 inch in some cases. Fabrication of such thick individual half ends 112a, 112b, 114a, 114b can involve use of high strength steel that is very costly to procure on a per unit volume. The fabrication process can be time consuming, therefore the costs of repair may be very high.

In the conventional technologies described above, fabrication of the individual parts to exactly match the environmental conditions can take an excessive amount of time, requiring the plant to cease operation. Such cessation of operation at the plant may incur large economic costs to operators.

There is a need to provide an apparatus and method that are easier to operate than conventional apparatus and methods for pipe system repair.

There is a further need to provide apparatus and method that do not have the drawbacks discussed above, including high costs of materials used, excessive time for fabrication and necessity of plant shutdown.

There is a still further need to reduce economic costs associated with operations and apparatus described above with conventional tools wherein leaks in piping systems can be quickly repaired by workers with common tool knowledge.

There is a further need to provide a system that will ensure the integrity of the pipe system and contain a leak that may develop within a piping system.

There is also a need to provide an apparatus and method that will allow for repair of piping systems to reduce environmental concerns at an industrial or commercial facility.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an enclosure apparatus is disclosed. The apparatus may comprise at least three bodies, each of the bodies having a connection portion and a receiving portion and an inside face and an outside face. The apparatus may also comprise at least two connectors for each of the at least three bodies, wherein each of the connectors is configured to insert into the connection portion and the receiving portion, wherein when the at least three bodies are connected and positioned around a pipe, a volume is formed between an exterior surface of the pipe and the at least three bodies.

In one example embodiment, a method for containing a leak or potential leak from a pipe is disclosed. The method may comprise connecting a first body of an arrangement to a second body of the arrangement to form a first half body. The method may also comprise connecting a third body of the arrangement to a fourth body of the arrangement to form a second half body. The method may also comprise connecting the first half body to the second half body around the pipe such that the arrangement forms a volume around the pipe and wherein the arrangement contains any leak within the volume.

In one example embodiment, an enclosure section for a modular repair enclosure is disclosed. The enclosure section may comprise a connection portion located on one end of the enclosure section, the connection portion having one or more attachment points formed therein. The enclosure section may also comprise a receiving portion located at an opposite end of the enclosure section, the receiving portion having one or more attachment points formed therein, each attachment point in the receiving portion aligned with an attachment point in the connection portion. The enclosure section may further comprise an outside face extending between the connection portion and the receiving portion, and an inside face extending between the connection portion and the receiving portion. The inside face may have at least one curved surface thereon such that when at least three enclosure sections are connected to one another around a pipe, a volume is formed between an exterior surface of the pipe and the enclosure sections.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

FIG. 3 shows a flowchart for a method of containing a leak in a leaking pipe in one example embodiment of the disclosure.

Figure 1:
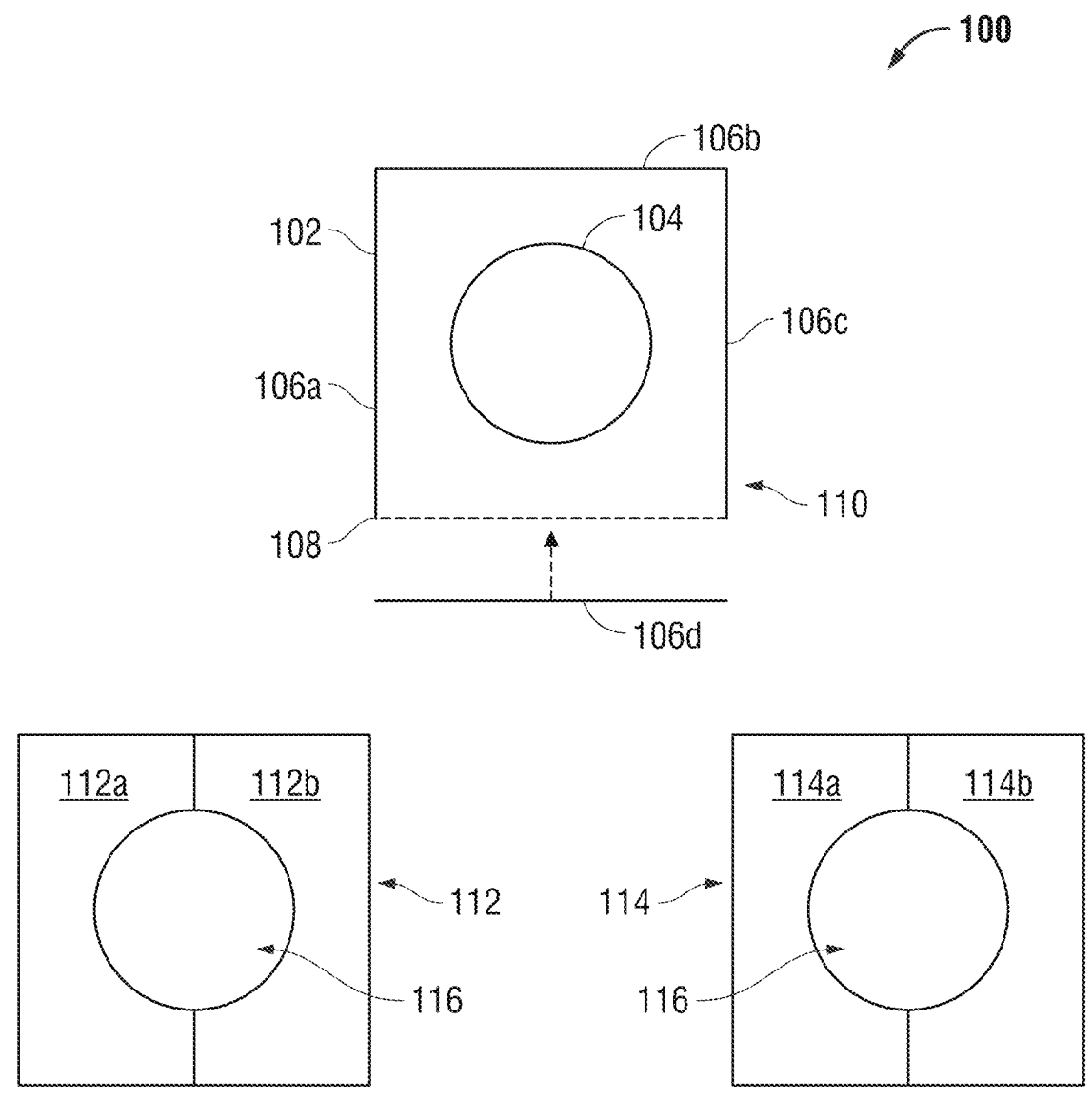
FIG. 1 shows a side view of a conventional apparatus to contain a leaking pipe.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer, or section. Terms such as "first," "second" and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below," "up" and "down," "upper" and "lower", "upwardly" and "downwardly", and other like terms indicating relative positions above or below a given point are used in this description to more clearly describe certain embodiments.

Figure 2:
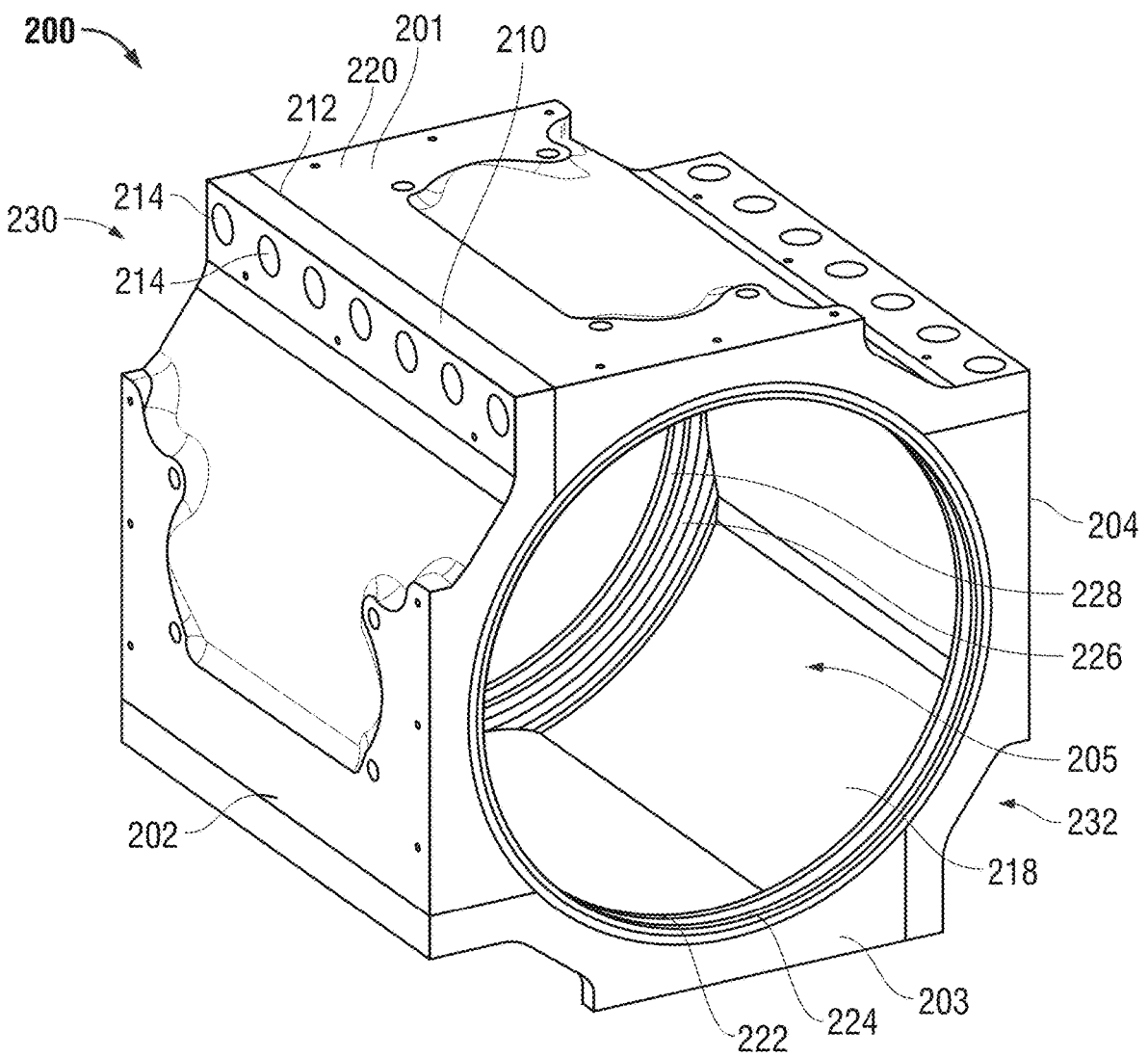
FIG. 2 shows a perspective view of a modular repair enclosure apparatus to contain fluids from a leaking pipe in one example embodiment of the disclosure.

Referring to FIG. 2, an exemplary apparatus 200 is illustrated in the form of a modular repair enclosure composed of multiple interchangeable sections for containment of a leak (or potential leak) when assembled around a pipe (not expressly shown). The apparatus 200 may be used in a method, such as that shown and described in FIG. 3, for containment of a leak in a pipe and providing a seal around the pipe. The apparatus 200 in this example may be made of four interchangeable enclosure sections 201, 202, 203, 204 that, when assembled, encircle the pipe section to ensure that any leak (or potential leak) is contained within a volume 205 formed by the joining of the various sections 201, 202, 203, 204 to one another on the pipe. It will be understood that although four interchangeable enclosure sections 201, 202, 203, 204 are shown here, fewer enclosure sections (e.g., three) or more enclosure sections (e.g., five, six, seven, eight, etc.) may also be used within the scope of the present disclosure.

In embodiments, the modular repair enclosure apparatus 200 is provided with sufficient clamping force such that any fluid that leaks from the pipe is retained in the containment volume 205 up to a desired fluid pressure level. Each of the enclosure sections 201, 202, 203, 204 are configured with a connection portion 210 at one end and a receiving portion 212 at an opposite end, such that the connection portion 210 of one enclosure section mates with the receiving portion 212 of an adjacent enclosure section when the apparatus is assembled. The connection portion 210 is provided with attachments points 214 that allow for connectors 216 (see FIG. 4) to be inserted into the attachment points 214. In the present example, seven attachment points 214 are shown on each connection portion 210, but fewer or more than seven may be used within scope of the present disclosure. The attachments points 214 may be through holes in some embodiments and the connectors 216 may be threaded studs or bolts (and corresponding nuts), with the threads running along nearly the entire length of each connector 216. Corresponding attachment points (see FIG. 6B), which may be threaded blind holes (i.e., holes that terminate) in some embodiments, are provided on the receiving portion 212 of each enclosure section to receive the connectors 216.

Each of the various enclosure sections 201, 202, 203, 204 has an inside face 218 and an outside face 220. The inside face 218 of each section 201, 202, 203, 204 is configured to form the containment volume 205 mentioned above when the enclosure sections are connected together. In some embodiments, each inside face 218 describes a generally curved surface so that the containment volume 205 formed by the inside faces 218 resembles a bore hole. The bore hole 205 has a diameter specifically selected to accommodate a number of piping systems of which a portion is to be encapsulated, while leaving a gap between the inside faces 218 and an exterior of the pipe. The gap allows a single apparatus 200 to accommodate multiple different pipe diameters simply by adding compression rings that are appropriately sized for each pipe diameter in the opening at each end of the apparatus.

In one embodiment, each of the various enclosure sections 201, 202, 203, 204 is provided with a series of compression rings 222, 224, 226, 228 (or ring portions). In the illustrated embodiment, two compression rings 222, 224 (or portion thereof) and 226, 228 (or portion thereof) are provided for each end, respectively, of each body 201, 202, 203, 204. Additional compression rings or fewer compression rings may also be used depending on the needs of the repair application. Each compression ring 222, 224, 226, 228 may be made of a durable material to allow for successful clamping of the bodies 201, 202, 203, 204 to the piping system. The durable material may be a malleable metal, or a rubber, silicon, or other material. Such provision of a double compression ring 222, 224, 226, 228 allows for single failure proof leak provision capability. Embodiments contemplate a durable material, such as stainless steel or carbon steel as non-limiting embodiments, being used for each body 201, 202, 203, 204. Other possible materials include aluminum, magnesium, tungsten, brass, and copper. In one example, the bodies 201, 202, 203, 204 may be made of a 516-grade 70 steel.

Referring to FIG. 3, a method 300 for containing a section of pipe that leaks is illustrated. The method may be used to contain a fluid, such as water, in the vicinity of the piping system in the event of a leak. Although described as water, other fluids may be contained using this method. In one embodiment, a first modular repair enclosure body (201) is located or positioned adjacent to a second modular repair enclosure body (202) at 302, such that the connection portion (210) of one body is mated or otherwise aligned to the receiving portion (212) of the other body. The first body is then connected to the second body at 304 through a mechanical connection to form a first enclosure half (230), such as by screwing bolts (216) through the through holes (214) of one body and into the corresponding blind holes of the adjacent body, and tightening nuts around the bolts. A third modular repair enclosure body (203) is located or positioned adjacent to a fourth modular repair enclosure body (204) at 306. The third body is then connected to the fourth body at 308 to form a second enclosure half (232) in the same manner discussed previously. The mechanical connections may also be accomplished by a method that involves the use of screws, hinges/latches, pins, or welds, as well as other components known to those skilled in the art.

At 310, each of the first enclosure half (230) and the second enclosure half (232) are placed around the pipe on opposite sides from one another, wherein the connection portion (210) of one enclosure half is mated or otherwise aligned to the receiving portion (212) of the other enclosure half. Then, upon abutment of the first enclosure half and the second enclosure half, a containment volume (205) is formed around any leak (or potential leak) in the pipe. At 312, a mechanical connection is established between the first enclosure half and the second enclosure half in the same manner discussed above, thereby fastening the first enclosure half and the second enclosure half to form an enclosure, wherein any leak is at least partially within the enclosure and the enclosure forms a seal around the leak. As will be understood, the mechanical connection established between the first enclosure half and the second enclosure half may be a bolted connection. The bolted connection may use through bolts placed through respective sections of the first enclosure half and the second enclosure half. In other alternative embodiments, bolts may be inserted into a screw end connection on each of the enclosure halves that have matching threads to the bolts used for connection.

In the FIG. 3 example, the enclosure halves (230, 232) are described as being separately assembled, then positioned around the pipe opposite from one another and connected to each other. However, it is also possible to assemble one of the enclosure halves (230) and position that half on the pipe first, then connect the remaining enclosure sections to the assembled enclosure half sequentially, rather than assemble the remaining enclosure sections into a separate enclosure half.

Figure 4:
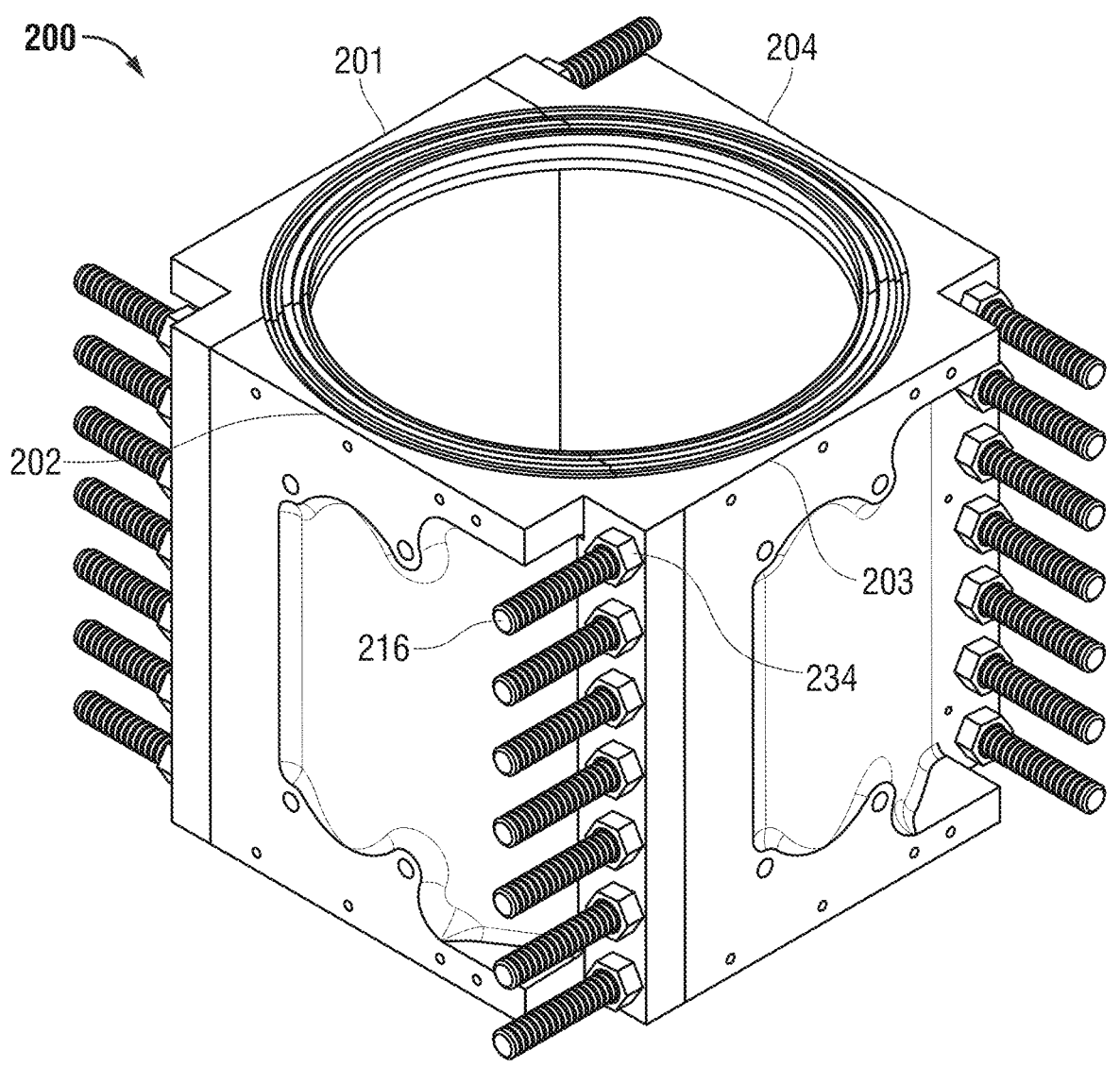
FIG. 4 shows a perspective view of a modular repair enclosure apparatus in an assembled form in one example embodiment of the disclosure.

FIG. 4 illustrates the exemplary modular repair enclosure apparatus 200 in an assembled form, with the various bodies 201, 202, 203, 204 connected to one another. As can be seen in this view, the bolts 216 are screwed through the through holes 214 (not visible) of one body and into the corresponding blind holes of the adjacent body. Nuts 234 are thereafter tightened onto the bolts 216 to clamp the various bodies 201, 202, 203, 204 to one another (and thereby clamp the apparatus 200 to the pipe).

The above 4-piece modular repair enclosure apparatus 200 provides significant material cost savings over prior solutions. This is because each of the sections that make up a modular repair enclosure is typically formed from a single solid block of steel. For example, U.S. Pat. No. 8,210,210, assigned to the present Applicant and incorporated herein by reference, discloses a 2-piece enclosure where each enclosure half is machined from a single block of steel. Such a 2-piece enclosure requires each block to be thick enough for a semicircular cylindrical volume of steel to be removed from the block to form a bore hole in the enclosure. The semicircular cylindrical volume of steel is then typically discarded or scrapped, as it cannot be easily repurposed. In contrast, a 4-piece enclosure of comparable size, as disclosed herein, only requires a quadricircular cylindrical volume of steel to be removed from each block, not a semicircular cylindrical volume. This allows much thinner blocks of steel to be used and results in much less steel being scrapped, and thus significant cost savings can be realized. It has been found, for example, that an enclosure that normally requires 7-inch thick blocks in a 2-piece arrangement would only require 3-inch thick blocks in a 4-piece arrangement. In addition, each section of a 4-piece enclosure is smaller and weighs less, and is thus easier to work with on an individual section basis compared to a section of a comparable 2-piece enclosure. Each enclosure section can also be pre-manufactured and stocked in inventory to allow for much faster repair response times on a leaking pipe compared to conventional methods that require custom manufacturing of the repair enclosure.

Figure 5:
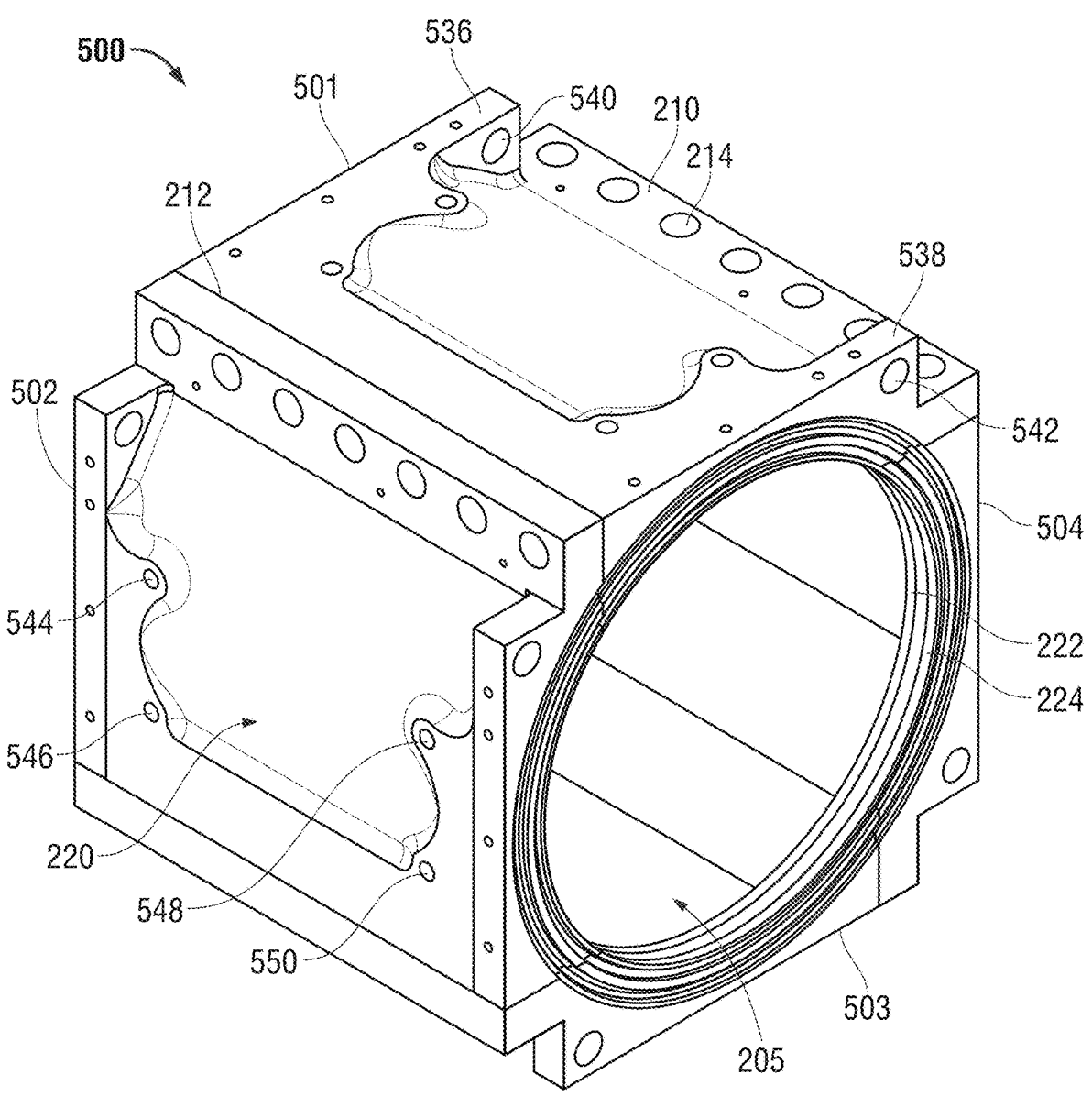
FIG. 5 shows a perspective view of another modular repair enclosure apparatus in one example embodiment of the disclosure.

FIG. 5 illustrates another exemplary modular repair enclosure apparatus 500 having multiple interchangeable sections according to embodiments of the present disclosure. The apparatus 500 is similar to the apparatus 200 of FIG. 2 insofar as there are four interchangeable enclosure sections 501, 502, 503, 504 that, when assembled on a pipe, encircle the pipe to contain any leak (or potential leak) that may be present.

In addition, the apparatus 500 is provided with a plurality of linking tabs that may be used to connect multiple apparatuses 500 to one another. As best seen on the first enclosure section 501, each section includes two linking tabs 536, 538, one on each corner adjacent to the connection portion 210 of each enclosure section. It is of course possible to locate the linking tabs 536, 538 in a different position on the enclosure section 501 within the scope of the present disclosure. Each linking tab 536, 538 has a through hole 540, 542 formed therein, respectively, that can be used to mechanically connect each linking tab 536, 538 to a corresponding linking tab 536, 538 on a corresponding enclosure section 501 of an adjacent apparatus 500. Assembling the enclosure sections 501, 502, 503, 504 to one another gives the apparatus 500 four linking tabs 536 on one end and four linking tabs 538 on an opposite end. The linking tabs 536 on one apparatus 500 may then be bolted or otherwise secured to the linking tabs 538 on an adjacent apparatus 500 to secure the apparatuses 500 together.

Further, as best seen on the second enclosure section 502, each section also includes a plurality of lifting holes for allowing lifting equipment to physically engage each section, either directly or indirectly. In the example shown, four blind lifting holes 544, 546, 548, 550 are provided on the exterior face 220 of the enclosure section 502 and arranged in a generally rectangular pattern in the middle of the enclosure section 502. Note that similar lifting holes, although not expressly labeled, are also present on the exterior faces 220 of the enclosure sections of the apparatus 200 in FIG. 2. The lifting holes 544, 546, 548, 550 may have a vertical spacing of about 3 inches and a horizontal spacing of about 9 inches in some embodiments, although a different vertical and/or horizontal spacing may certainly be used. Lifting equipment may then be used to physically engage the lifting holes 544, 546, 548, 550 to lift, transport, and otherwise manipulate the enclosure section 502.

Figures 6A, 6B, 6C, 6D:
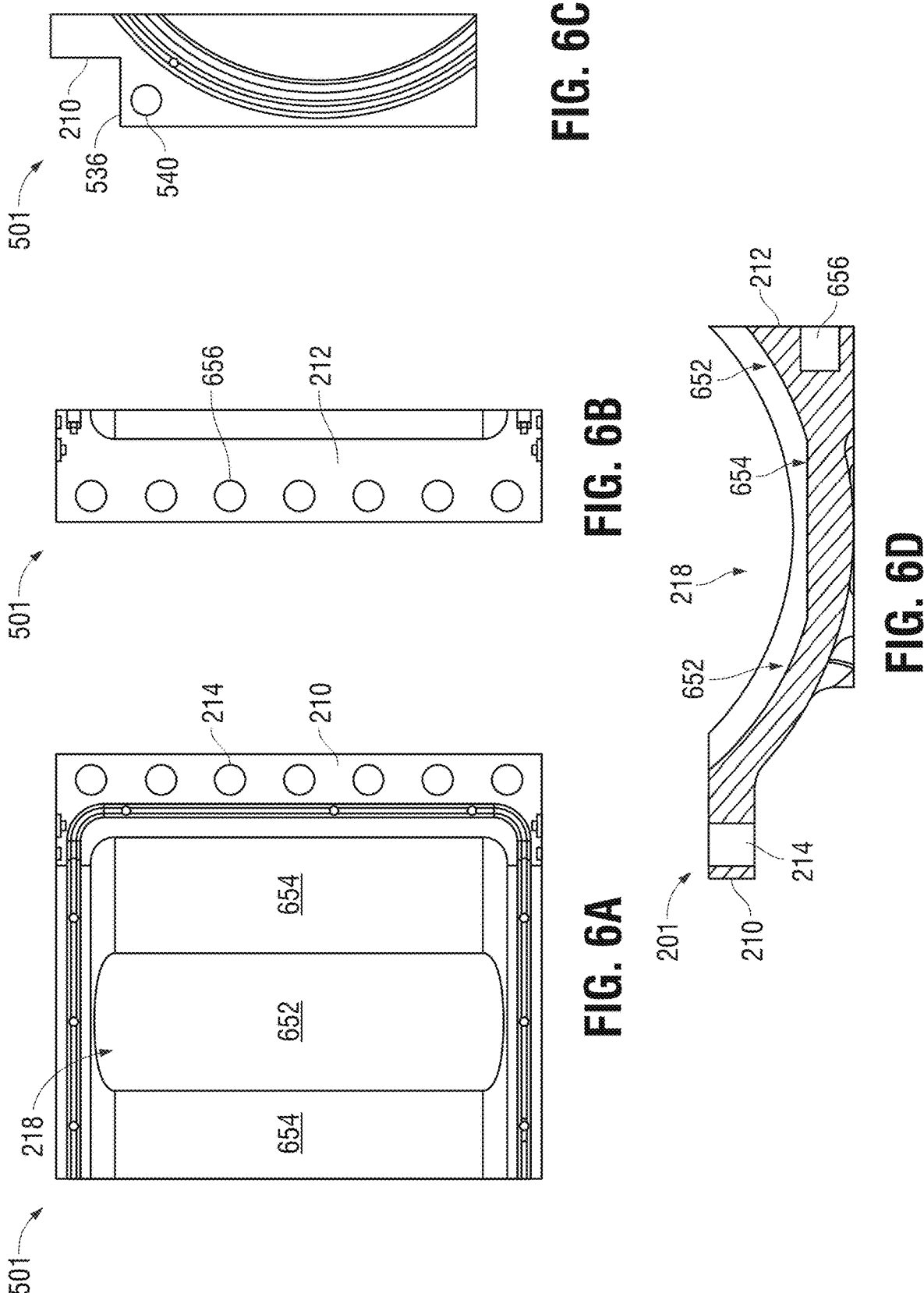
FIGS. 6A-6C show interior, front, and side views of an interchangeable section for a modular repair enclosure apparatus in one example embodiment of the disclosure.
FIG. 6D shows a cross-sectional side view of another interchangeable section for a modular repair enclosure apparatus in one example embodiment of the disclosure.

FIGS. 6A-6C illustrate additional details of the exemplary first enclosure section 501 from FIG. 5. FIG. 6A shows a view of the interior face 218 of the enclosure section 501, FIG. 6B shows a view of the front of the enclosure section 501, and FIG. 6C shows a side view of the enclosure section 501. Several exemplary dimensions are also shown for illustrative purposes and are not intended to be limiting. As these views show, in some embodiments, the interior face 218 of each enclosure section may include a curved surface 652 and two flat surfaces 654, one on each side of the curved surface 652. The flat surfaces 654 allow the enclosure sections to be more easily held or otherwise secured and machined for bore completion purposes. The attachment points (threaded blind holes) mentioned earlier in the receiving portion 212 of each enclosure may also be seen at 656.

FIG. 6D likewise illustrates additional details of the exemplary first enclosure section 201 of the apparatus 200 discussed earlier with respect to FIG. 2. Unlike the exemplary first enclosure section 501 of the apparatus 500, the interior face 218 of the exemplary first enclosure section 201 includes two curved surfaces 652 and one flat surface 654, one curved surface 652 on each side of the flat surface 654. As before, the flat surface 654 allows the enclosure sections to be more easily held or otherwise secured and machined for bore completion purposes.

Figure 7:
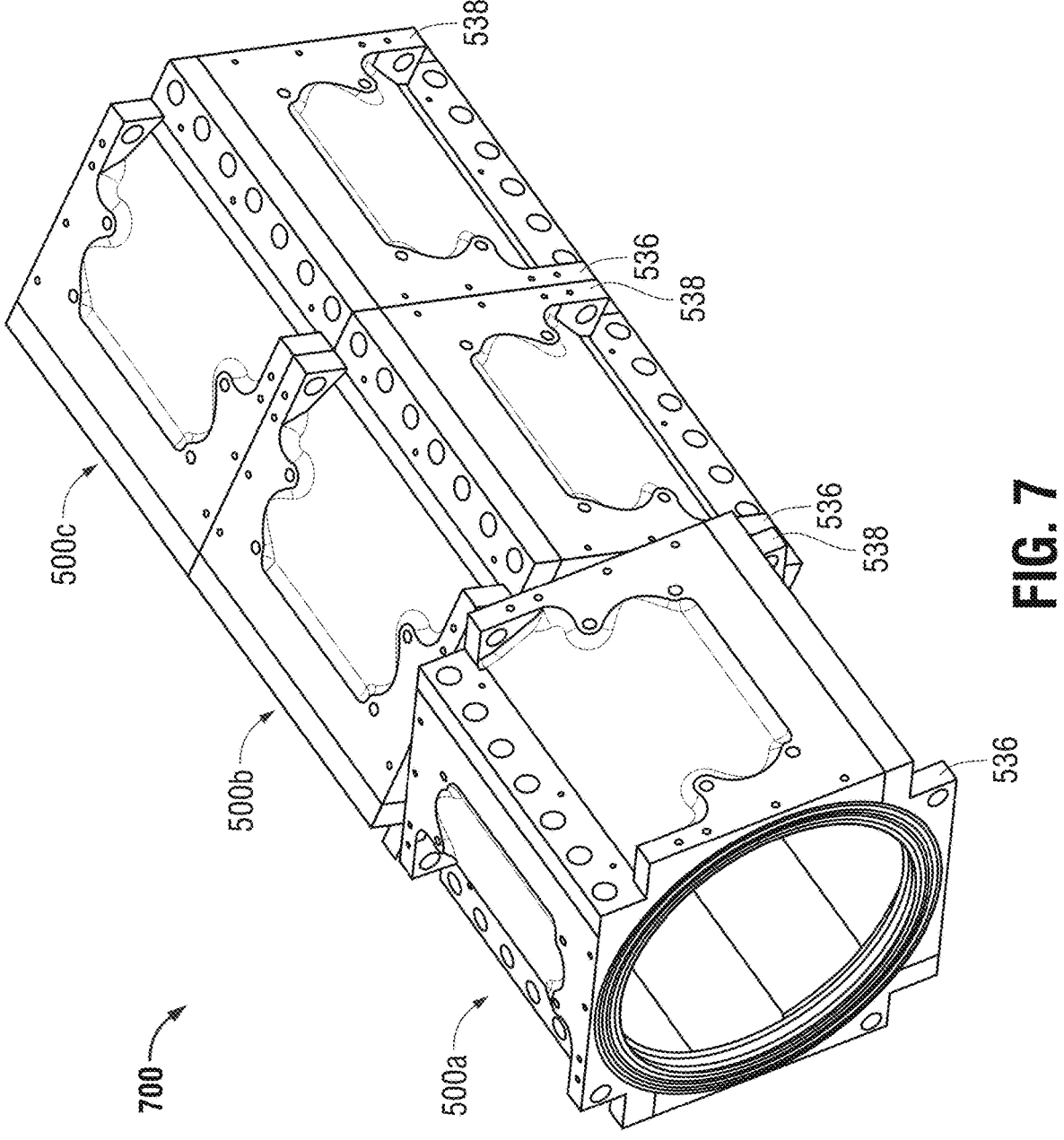
FIG. 7 shows a series of modular repair enclosure apparatuses in one example embodiment of the disclosure.

FIG. 7 illustrates an exemplary string of modular repair enclosure apparatuses that may be secured to one another. In this example, three modular repair enclosure apparatuses 500a, 500b, 500c have been positioned adjacent to one another to form a string 700 of enclosure apparatuses. The linking tabs 536 of one enclosure apparatuses 500a, 500b, 500c may then be mechanically connected (e.g., bolted) to the linking tabs 538 of and adjacent enclosure apparatus 500a, 500b, 500c to secure the apparatuses to one another.

Figure 8:
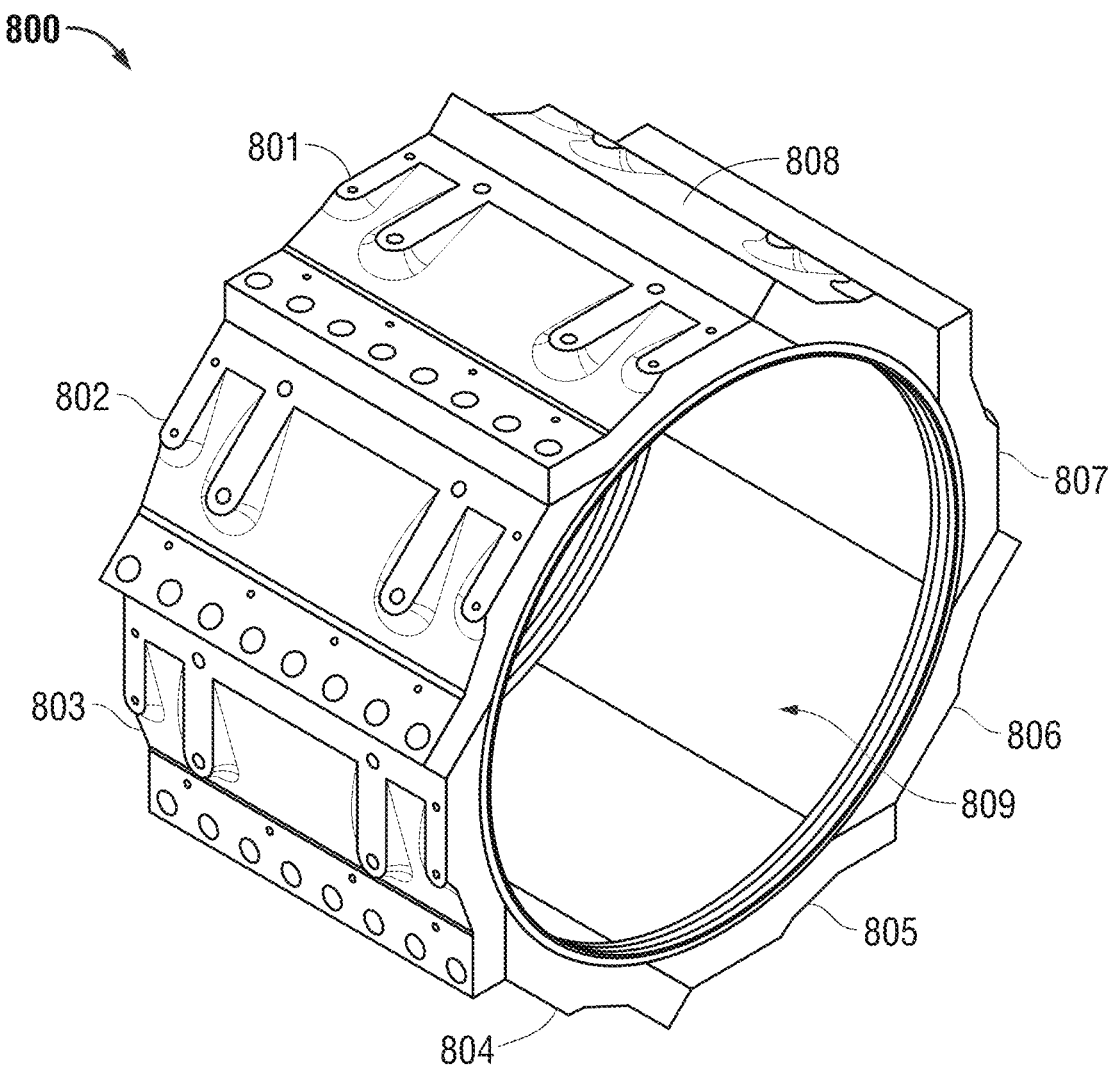
FIG. 8 shows a perspective view of yet another modular repair enclosure apparatus in one example embodiment of the disclosure.

Referring now to FIG. 8, yet another exemplary modular repair enclosure apparatus 800 having multiple interchangeable sections according to embodiments of the present disclosure is shown. The apparatus 800 is similar to the apparatuses 200 and 500 of FIGS. 2 and 5, except that there are eight interchangeable enclosure sections 801, 802, 803, 804, 805, 806, 807, 808. When assembled on a pipe, the interchangeable enclosure sections encircle the pipe to form a containment volume 809 that contains any leak (or potential leak) present in the pipe (not expressly shown). The use of eight interchangeable enclosure sections allows even thinner blocks of steel to be used compared to a 4-piece arrangement and results in even less steel having to be scrapped.

Figure 9:
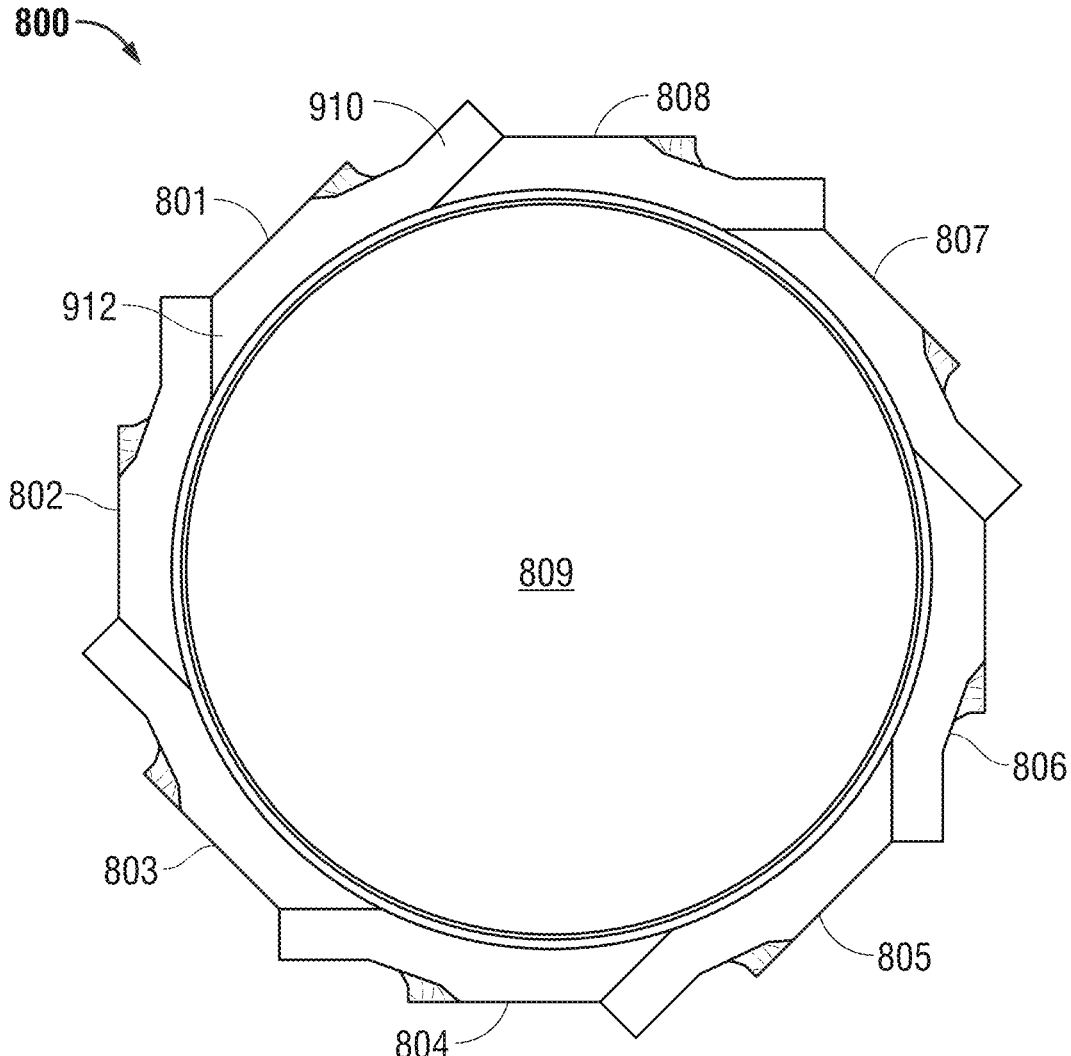
FIG. 9 shows a plan view of the modular repair enclosure apparatus of FIG. 8 in one example embodiment of the disclosure.

FIG. 9 shows a plan view of the exemplary modular repair enclosure apparatus 800 from FIG. 8. As best seen with respect to the first enclosure section 801, each enclosure section includes a connection portion 910 and a receiving portion 912. The connection portion 910 of one enclosure section mates with the receiving portion 912 of an adjacent enclosure section to allow the various enclosure sections to be connected to one another.

Figure 10A:
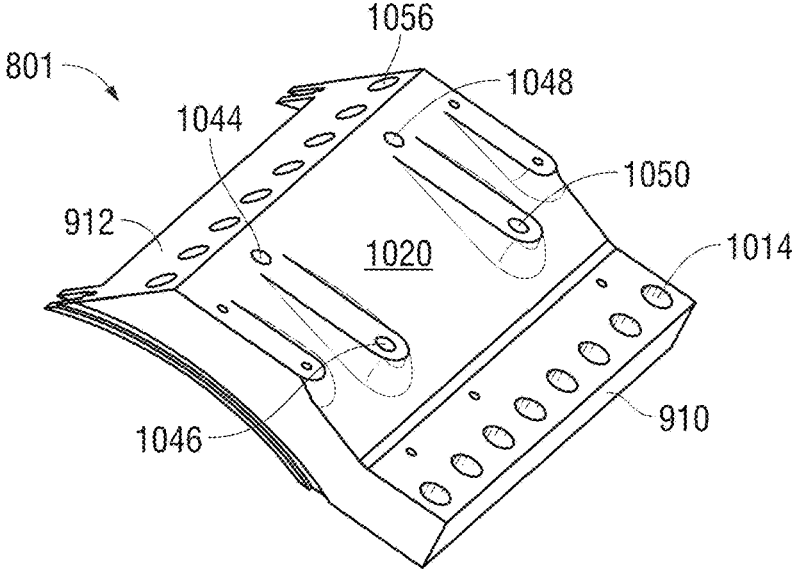
FIGS. 10A-10C show exterior, interior, and side views of an interchangeable section for the modular repair enclosure apparatus of FIG. 8.
Figure 10B:
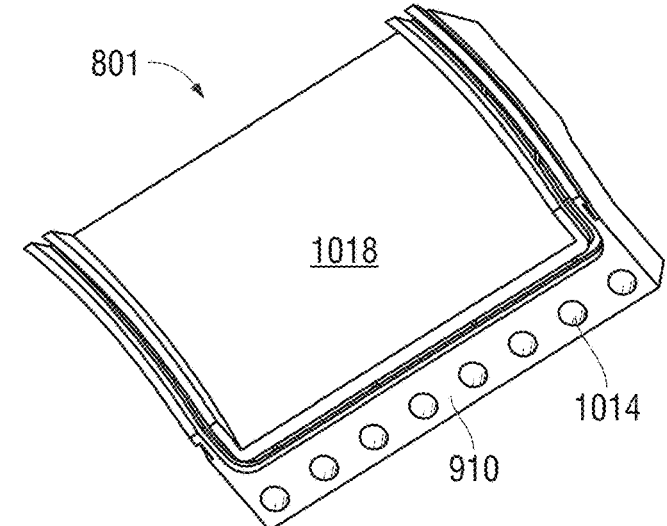
Figure 10C:
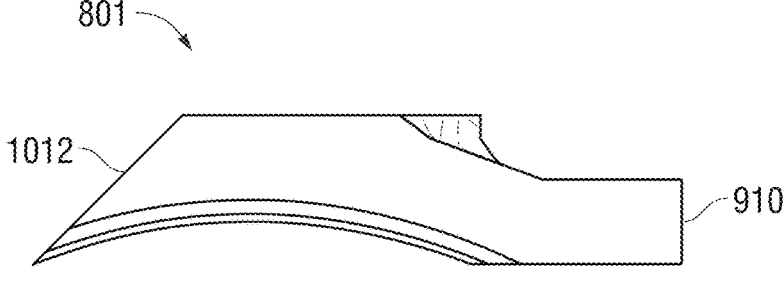

FIGS. 10A-10C illustrate additional details of the exemplary first enclosure section 801 from FIG. 8. FIG. 10A shows a view of the exterior face 1020 of the enclosure section 801, FIG. 10B shows a view of the interior face 1018 of the enclosure section 801, and FIG. 10C shows a side view of the enclosure section 801. As these views show, in some embodiments, the exterior face 1020 of the enclosure section 801 is provided with a plurality of lifting holes 1044, 1046, 1048, 1050 to allow lifting equipment to physically engage the enclosure section 801. In a similar manner, each connection portion 910 is provided with a plurality of attachment points 1014 that may be in the form of through holes, and each receiving portion 912 may be provided with a plurality of attachment points 1056 in the form of threaded blind holes. The interior face 218 of each enclosure section in this embodiment is curved. The attachment points (threaded blind holes) mentioned earlier in the receiving portion 212 of each enclosure may also be seen at 656.

Thus far, a number of specific embodiments have been described. Those having ordinary skill in the art will understand that numerous variations and modifications exist within the scope of the present disclosure. In one example embodiment, an apparatus is disclosed. The apparatus may comprise at least three bodies, each of the bodies having a connection portion and a receiving portion and an inside face and an outside face. The apparatus may also comprise at least two connectors for each of the at least three bodies, wherein each of the connectors is configured to insert into the connection portion and the receiving portion, wherein when the at least three bodies are connected and positioned around a pipe, a volume is formed between an exterior surface of the pipe and the at least three bodies.

In another example embodiment, the apparatus may be configured wherein the at least three bodies is four bodies.

In another example embodiment, the apparatus may be configured wherein each of the at least two connectors for each of the at least three bodies has a threading on an exterior surface of the connector.

In another example embodiment, the apparatus may be configured wherein each of the at least three bodies is identical in size and shape.

In another example embodiment, the apparatus may be configured wherein each of the at least two connectors is a bolt with an associated nut.

In another example embodiment, the apparatus may be configured wherein the at least two connectors is seven connectors.

In another example embodiment, the apparatus may be configured wherein each of the at least three bodies is made of metal.

In another example embodiment, the apparatus may be configured wherein the metal is one of aluminum, carbon steel, stainless steel, magnesium, tungsten, brass, copper.

In another example embodiment, the apparatus may be configured wherein the inside face of each of the at least three bodies is provided with at least two compression rings.

In another example embodiment, the apparatus may be configured wherein the at least two compression rings is four compression rings.

In one example embodiment, a method for containing a leak or potential leak from a pipe is disclosed. The method may comprise connecting a first body of an arrangement to a second body of the arrangement to form a first half body. The method may also comprise connecting a third body of the arrangement to a fourth body of the arrangement to form a second half body. The method may also comprise connecting the first half body to the second half body around the pipe such that the arrangement forms a volume around the pipe and wherein the arrangement contains any leak within the volume.

In one example embodiment, the method may be performed wherein the connecting of the first body of the arrangement to the second body is through a mechanical connection.

In one example embodiment, the method may be performed wherein the mechanical connection is through one of a bolt and nut arrangement and a stud and two nuts arrangement.

In one example embodiment, the method may be performed wherein the connecting the first body of the arrangement to the second body of the arrangement is through seven mechanical connections.

In one example embodiment, the method may be performed wherein the connecting the third body of the arrangement to the fourth body of the arrangement is through seven mechanical connections.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An enclosure apparatus, comprising:
   at least three bodies, each of the bodies having a connection portion and a receiving portion and an inside face and an outside face, the connection portion having at least one opening therein and the receiving portion having at least one threaded opening therein; and
   at least two connectors for each of the at least three bodies, wherein each of the connectors has a threading on an exterior surface thereof and is configured to insert into the at least one opening of the connection portion of one of the at least three bodies and the at least one threaded opening of the receiving portion of an adjacent body of the at least three bodies, wherein when the at least three bodies are connected and positioned around a pipe, a containment volume is formed between an exterior surface of the pipe and the at least three bodies.

2. The apparatus according to claim 1, wherein the at least three bodies is four bodies.

3. The apparatus according to claim 1, wherein each of the at least three bodies is identical in size and shape.

4. The apparatus according to claim 1, wherein each of the at least two connectors is a bolt with an associated nut.

5. The apparatus according to claim 1, where the at least two connectors is seven connectors.

6. The apparatus according to claim 1, wherein each of the at least three bodies is made of metal.

7. The apparatus according to claim 6, wherein the metal is one of aluminum, carbon steel, stainless steel, magnesium, tungsten, brass, copper.

8. The apparatus according to claim 1, wherein the at least three bodies is provided with at least two compression rings disposed on the inside face of each of the at least three bodies.

9. The apparatus according to claim 8, wherein the at least two compression rings is four compression rings.

10. The apparatus according to claim 1, wherein each of the bodies includes thereon a first linking tab and a second linking tab at opposite ends from one another, the first linking tab on a body of the apparatus being connectable to the second linking tab on a body of an adjacent apparatus to attach the apparatus to the adjacent apparatus.

11. A method for containing a pipe using an enclosure apparatus according to claim 1, wherein the at least three bodies comprises a first body, a second body, a third body, and a fourth body, the method comprising:

connecting the first body of the enclosure apparatus to the second body of the enclosure apparatus to form a first half body;

connecting the third body of the enclosure apparatus to the fourth body of the enclosure apparatus to form a second half body; and connecting the first half body to the second half body around the pipe such that the enclosure apparatus forms a volume around the pipe that contains any leak within the volume.

12. The method according to claim 11, wherein the connecting of the first body of the enclosure apparatus to the second body is through a mechanical connection.

13. The method according to claim 12, wherein the mechanical connection is through one of a bolt and nut arrangement and a stud and two nuts arrangement.

14. The method according to claim 11, wherein the connecting of the first body of the enclosure apparatus to the second body of the enclosure apparatus is through seven mechanical connections.

15. The method according to claim 11, wherein the connecting of the third body of the enclosure apparatus to the fourth body of the enclosure apparatus is through seven mechanical connections.

16. The method according to claim 11, further comprising connecting a first linking tab on a body of the enclosure apparatus to a second linking tab on a body of an adjacent enclosure apparatus to attach the enclosure apparatus to the adjacent enclosure apparatus.

17. An enclosure section for a modular repair enclosure, the enclosure section comprising:

a connection portion located on one end of the enclosure section, the connection portion having one or more attachment points formed therein;

a receiving portion located at an opposite end of the enclosure section, the receiving portion having one or more threaded attachment points formed therein, each threaded attachment point in the receiving portion aligned with an attachment point in the connection portion;

an outside face extending between the connection portion and the receiving portion; and an inside face extending between the connection portion and the receiving portion, the inside face having at least one curved surface thereon such that when at least three enclosure sections are connected to one another around a pipe, a containment volume is formed between an exterior surface of the pipe and the enclosure sections.

18. The enclosure section according to claim 17, wherein the outside face of the enclosure section has a plurality of lifting holes formed therein.

19. The enclosure section according to claim 17, wherein the one or more attachment points on the connection portion are through holes and the one or more attachment points on the receiving portion are blind holes.

20. The enclosure section of claim 17, wherein the enclosure section is configured to be interchangeable with other enclosure sections such that the connection portion receives a connector in the one or more attachment points thereof at an angle to a connector received in the one or more threaded attachment points of the receiving portion.

* * * * *